United States Patent Office

3,591,645
Patented July 6, 1971

3,591,645
PROCESS FOR PREPARING A HALOGENATED AROMATIC
Charles M. Selwitz, Pitcairn, Pa., assignor to Gulf Research & Development Company, Pittsburgh, Pa.
No Drawing. Continuation-in-part of application Ser. No. 602,469, Dec. 19, 1966. This application May 20, 1968, Ser. No. 730,589
Int. Cl. C07c 25/04
U.S. Cl. 260—650
38 Claims

ABSTRACT OF THE DISCLOSURE

A process for preparing a nuclear chloro or nuclear bromo aromatic hydrocarbon which involves heating an aromatic compound with a compound selected from the group consisting of copper, manganese, cerium, cobalt, vanadium, chromium, iron, nickel, cadmium, tin, antimony, mercury, bismuth, the noble metals (platinum, palladium, iridium, rhodium, osmium and ruthenium) and compounds of these metals, a nitrate ion, a nitrite ion, NO or $NO_2$, a chloride or bromide ion and an inert solvent.

---

This application is a continuation-in-part application of my application Ser. No. 602,469 filed Dec. 19, 1966, now abandoned.

This invention relates to a process for preparing a nuclear chloro or nuclear bromo aromatic hydrocarbon.

Chlorination or bromination of aromatic hydrocarbons can be effected, for example, by passing gaseous chlorine or bromine therethrough under appropriate reaction conditions. These processes are undesirable, however, for with the production of one mol of the halogenated aromatic hydrocarbon, one mol of undesired, and generally unusable, HCl or HBr is also produced. In the Raschig process, a technique has been developed whereby HCl is used to chlorinate benzene, but this oxychlorination involves a vapor phase reaction with oxygen and high temperatures. The Raschig process is not satisfactory for aromatics, except for benzene, since they are easily oxidized at the high temperatures, and in all cases conversion levels must be kept low (10 percent or less), because dichlorination becomes appreciable.

I have found that nuclear chlorination or bromination of an aromatic hydrocarbon can easily be effected, without resorting to vapor phase reactions, and good conversions and high yields to desired product can be attained, by heating said aromatic hydrocarbon in the presence of a compound selected from the group consisting of copper, manganese, cerium, cobalt, vanadium, chromium, iron, nickel, cadmium, tin, antimony, mercury, bismuth, the noble metals (platinum, palladium, iridium, rhodium, osmium and ruthenium) and compounds of these metals, a substance selected from the group consisting of nitrate ions, nitrite ions, NO and $NO_2$, a chloride or bromide ion and an inert organic solvent.

The aromatic hydrocarbon reactant employed herein can be an aromatic hydrocarbon, a halogenated (chloro, bromo, fluoro, or iodo) aromatic hydrocarbon, or a carboxylic acid ester of a hydroxyaromatic. The carboxylic acid portion can be derived from the group of carboxylic acids, straight and branched chain, having from one to forty, preferably from two to six carbon atoms. Examples of such carboxylic acids are the alkanoic acids such as formic, acetic, propionic, butyric, pivalic, octanoic, isooctanoic, benzoic, lauric, stearic, isobutyric, para-toluic, gamma-chlorobutyric, tetracontanoic, phenylacetic, cyclohexane carboxylic, crotonic, furoic, heptanoic, eicosanoic, etc. Examples of such aromatic hydrocarbons that can be employed herein include benzene, toluene, ethylbenzene, cumene, naphthalene, anthracene, biphenyl, phenanthrene, t-butylbenzene, α-phenylnaphthalene, para-xylene, polystyrene, terphenyl, 3-phenylheptane, 1,4-diphenyl butane, diphenyl methane, tetralin, propylium anion, etc.

Also present in the reaction system herein is a substance selected from the group consisting of copper, manganese, cerium, cobalt, vanadium, chromium, iron, nickel, cadmium, tin, antimony, mercury, bismuth, the noble metals and compounds of these metals which are mainly the salts and oxides of these metals. Examples of compounds that can be employed herein include metallic iron, ferric acetate, ferric propionate, ferric hydroxy acetate, ferric chloride, ferric hydroxide, ferric nitrate, ferric phosphate, ferric sulfate, ferrous acetate, ferrous nitrate, ferrous lactate, ferrous bromide, palladium, rhodium, iridium, osmium, ruthenium, platinum, rhodium formate, palladium acetate, palladium propionate, iridium butyrate, palladium pivalate, palladium octanoate, osmium isooctanoate, palladium benzoate, palladium laurate, ruthenium stearate, palladium isobutyrate, palladium para-toluate, platinum gamma-chlorobutyrate, ruthenium tetracontanoate, osmium phenylacetate, iridium cyclohexane carboxylate, rhodium crotonate, palladium furoate, palladium heptanoate, palladium eicosanoate, palladium chloride, palladium nitrate, palladium oxide, rhodium bromide, iridium sulfate, osmium cyanide, ruthenium perchlorate, rhodium iodide, platinum fluoride, platinum phosphate, platinum pyrophosphate, ruthenium oxide, platinic bromide, platinous bromide, platinum oxide, platinous cyanide, platinum hydroxide, rhodium sulfate, rhodium oxide, osmium tetroxide, ruthenium trichloride, iridium oxide, metallic copper, cupric nitrate, cuprous chloride, cupric acetate, manganese, manganic oxide, manganese acetate, cerium, cerous nitrate, ceric ammonium sulfate, cobalt, cobaltous bromide, cobaltous fluoride, cobaltous perchlorate, cobaltic chloride, vanadium, vanadium pentoxide, vanadium dichloride, vanadium pentafluoride, vanadyl bromide, chromium, chromium trioxide, chromic acetate, nickel, nickel acetate, nickel nitrate, cadmium, cadmium perchlorate, cadmium manganate, tin, tin tetrachloride, tin trifluoride, tin sulfate, antimony, antimony chloride, antimony butyrate, mercury, mercuric acetate, mercuric nitrate, bismuth, bismuth phosphate, bismuth arsenate, bismuth oxychloride, etc.

Of the noble metal compounds that are employed herein, I prefer a carboxylic acid salt of a noble metal. Thus, the cationic portion of the salt can be one of the defined noble metals, palladium, while the anionic portion thereof can be derived from the group of carboxylic acids, straight and branched chain, having from one to forty carbon atoms, preferably from two to six carbon atoms, examples of which have been identified above.

In order to obtain the desired conversion herein it is imperative that the above materials be brought into contact with each other in the presence of a substance selected from the group consisting of nitrate ions, nitrite ions, NO and $NO_2$. Thus, any compound falling within the above definition or which, for example, by ionization, oxidation or disproportionation, under the reaction conditions defined herein will result in the same can be employed. By "nitrate ions" I mean to include $NO_3^-$, a singly charged anion containing one nitrogen atom and three oxygen atoms. By "nitrite ion" I mean to include $NO_2^-$, a singly charged anion containing one nitrogen atom and two oxygen atoms. Examples of compounds that can be employed include nitric acid, sodium nitrate, cesium nitrate, sodium nitrite, potassium nitrite, nitric oxide, nitrous anhydride, nitrous acid, nitrogen dioxide, nitrogen tetroxide, nitric anhydride, nitrosyl chloride, nitrosyl bromide, nitroxyl chloride, etc. Additionally there must be present in the reaction system chloride ions or bromide ions in sufficient quantities to halogenate the aromatic compound defined above. By "chloride ions or bromide ions" I mean a singly negatively charged chlorine or bromine atom. Although the chloride ion or bromide ion can be obtained from one of the metal compounds defined hereinabove, such as ferric chloride or palladium chloride, this is not preferred. Desirably the chloride ion or bromide ion is obtained from any compound which is capable of dissociating in the reaction system to chloride or bromide ions, such as hydrogen chloride, hydrogen bromide, ammonium chloride, ammonium bromide, organic chlorides and bromides such as aniline hydrochloride, methyl amine hydrochloride, benzyl trimethyl ammonium bromide and metallic chlorides and bromides such as sodium chloride, potassium bromide, rubidium chloride, magnesium bromide, cupric chloride, barium chloride, calcium chloride, aluminum bromide, etc. The amount of chloride or bromide ion present in the system relative to the aromatic hydrocarbon reactant on a molar basis can be from about 10:1 to about 1:20, preferably from about 2:1 to about 1:2.

The reaction defined herein, in a preferred embodiment, is carried out in the presence of molecular oxygen. When this is done, less nitrate ion, nitrite ion, NO or $NO_2$ is required, less iron or noble metal or salt thereof is needed and the process can be carried out in a continuous manner. The amount of molecular oxygen that can be employed relative to the aromatic hydrocarbon reactant, on a molar basis, can be from about 1000:1 to about 1:10, preferably from about 10:1 to about 1:1.

The reactants employed herein are heated together in an inert organic solvent which will not adversely affect the course of the reaction and will not react with the reactants and/or the products produced herein. Examples of such solvents are ethers, amides, sulfoxides, ketones, such as meta dioxane, dimethylacetamide, dimethylformamide, dimethylsulfoxide, acetone, etc. In a preferred embodiment, however, the solvent is a liquid carboxylic acid, straight or branched chain, having preferably from one to ten carbon atoms, more preferably from two to six carbon atoms, specific examples of which have been set forth above.

The reaction defined herein is simply effected by bringing the materials together into contact with each other under specified conditions. The amount of metal, or compounds thereof, as metal, on a molar basis, employed can range from about 0.0001 percent to about five percent, preferably from about 0.01 percent to about one percent. The amount of nitrate ion, nitrite ion, NO or $NO_2$ employed, on a molar basis, relative to the aromatic compound, can be from about 1:1 to about $1:10^6$, preferably from about 1:3 to about $1:10^6$. The amount of solvent employed can be from about 0.1 to about 1000 mols, preferably from about one to about fifty mols, per mol of aromatic compound. The temperature employed during the process can range from about 15° to about 200° C., preferably from about 60° to about 150° C., the pressure from about 0.1 to about 10,000 pounds per square inch gauge, preferably from about ten to about 1000 pounds per square inch gauge and the contact time from about 0.0001 to about 200, preferably from about one to about ten hours.

At the end of the reaction period, the desired chloro or bromo aromatic compound can be recovered from the reaction mixture in any suitable manner, for example, by distillation at a temperature of about 50° to about 200° C. and a pressure of about 0.001 to about ten pounds per square inch gauge. Depending upon the boiling points of the products in the reaction mixture, the individual components thereof, including the desired chloro or bromo aromatic, will come off individually overhead and can thus be easily recovered.

The process of the invention can further be illustrated by the following.

EXAMPLE I

A mixture of reactants, as set forth below in Table I, was refluxed at atmospheric pressure and 115° C. Analysis by gas chromatography resulted in data reproduced below in Table I.

TABLE I

| Run No. | Salt | Millimols of— | | | | Reaction time, hours | Millimols $NaNO_3$ | Product | Millimols product |
|---|---|---|---|---|---|---|---|---|---|
| | | Salt | Palladium acetate | Benzene | $HNO_3$ | Acetic acid | | | |
| 1 | Sodium acetate | 10.0 | 1.0 | 20.0 | 5.0 | 400 | 66 | 0.0 | Phenyl acetate | 0.03 |
| 2 | NaF | 10.0 | 1.0 | 20.0 | 5.0 | 400 | 66 | 0.0 | do | 0.93 |
| 3 | NaCl | 10.0 | 1.0 | 20.0 | 5.0 | 400 | 66 | 0.0 | $C_6H_5Cl$ | 4.1 |
| 4 | NaBr | 10.0 | 1.0 | 20.0 | 5.0 | 400 | 66 | 0.0 | $C_6H_5Br$ | 2.8 |
| 5 | NaI | 10.0 | 1.0 | 20.0 | 5.0 | 400 | 66 | 0.0 | None | 0.0 |
| 6 | KCN | 10.0 | 1.0 | 20.0 | 5.0 | 400 | 66 | 0.0 | do | 0.0 |
| 7 | KCN | 10.0 | 1.0 | 20.0 | 15.0 | 400 | 24 | 0.0 | do | 0.0 |
| 8 | KCN | 10.0 | 1.0 | 20.0 | 10.0 | 400 | 24 | 0.0 | do | 0.0 |
| 9 | KCN | 5.1 | 1.0 | 160.0 | 0.0 | 400 | 24 | 0.0 | do | 0.0 |
| 10 | KCN | 5.6 | 1.0 | 20.0 | 0.0 | 400 | 24 | 0.0 | do | 0.0 |
| 11 | KCN | 5.1 | 1.0 | 160.0 | 5.0 | 400 | 24 | 0.0 | do | 0.0 |
| 12 | KCN | 5.6 | 1.0 | 20.0 | 5.0 | 400 | 24 | 0.0 | do | 0.0 |
| 13 | NaCl | 10.0 | 1.1 | 20.0 | 0.0 | 400 | 24 | 11.0 | $C_6H_5Cl$ | 7.2 |

EXAMPLE II

A mixture of reactants, as set forth below in Table II, was refluxed at atmospheric pressure and 115° C. Analysis by gas chromatography resulted in the following data.

TABLE II

| Run No. | Salt | Millimols of— | | | | | | | Reaction time, hours | Millimols product | Product |
|---|---|---|---|---|---|---|---|---|---|---|---|
| | | Salt | Palladium acetate | Benzene | $HNO_3$ | $NaNO_3$ | HCl | Acetic acid | | | |
| 14 | Sodium acetate | 10.0 | 1.0 | 20.0 | 5.0 | 0.0 | 0.0 | 400 | 66 | 0.03 | Phenyl acetate. |
| 15 | None | 0.0 | 5.0 | 20.0 | 10.0 | 0.0 | 0.0 | 400 | 24 | 3.3 | Do. |
| 16 | NaCl | 10.0 | 1.0 | 20.0 | 5.0 | 0.0 | 0.0 | 400 | 66 | 4.1 | $C_6H_5Cl$ |
| 17 | NaCl | 10.0 | 1.1 | 20.0 | 0.0 | 11.0 | 0.0 | 400 | 24 | 7.2 | $C_6H_5Cl$ |
| 18 | None | 0.0 | 1.2 | 20.0 | 0.0 | 0.0 | 12.0 | 400 | 24 | 0.0 | None. |

The above data show that in order to obtain the desired halogenation herein it is necessary that the nitrate ion be present.

EXAMPLE III

A series of runs were carried out wherein a mixture of reactants was refluxed at atmospheric pressure and 115° C. Analysis of the reaction product by gas chromatography resulted in the following data which illustrate that noble metals are effective herein.

TABLE III

| Run No. | Metal | Gram atoms of metal | Millimols HNO3 | Salt | Millimols of Salt | Millimols of Benzene | Millimols of NaNO3 | HCl | Reaction time, hours | Millimols acetic acid | Product | Millimols product |
|---|---|---|---|---|---|---|---|---|---|---|---|---|
| 19 | Pd | 0.13 | 1.0 | NaCl | 10.0 | 20.0 | 0.0 | 0.0 | 93 | 400 | $C_6H_5Cl$ | 2.6 |
| 20 | Pt | 0.10 | 1.0 | NaCl | 10.0 | 20.0 | 0.0 | 0.0 | 93 | 400 | $C_6H_5Cl$ | 0.45 |
| 21 | Rh | 0.25 | 1.0 | NaCl | 10.0 | 20.0 | 0.0 | 0.0 | 93 | 400 | $C_6H_5Cl$ | 0.12 |
| 22 | Ir | 0.13 | 1.0 | NaCl | 10.0 | 20.0 | 0.0 | 0.0 | 93 | 400 | $C_6H_5Cl$ | 0.09 |
| 23 | Ru | 0.24 | 1.0 | NaCl | 10.0 | 20.0 | 0.0 | 0.0 | 93 | 400 | $C_6H_5Cl$ | 0.01 |
| 24 | Ru | 0.28 | 1.0 | NaBr | 10.0 | 20.0 | 0.0 | 0.0 | 93 | 400 | $C_6H_5Br$ | 0.03 |
| 25 | Pd | 0.12 | 10.0 | NaBr | 11.0 | 20.0 | 0.0 | 0.0 | 17.5 | 400 | $C_6H_5Br$ | 0.17 |
| 26 | Pt | 0.13 | 10.0 | NaCl | 10.0 | 20.0 | 0.0 | 0.0 | 17.5 | 400 | $C_6H_5Cl$ | 2.3 |
| 27 | Pd | 0.13 | 10.0 | NaCl | 10.0 | 20.0 | 0.0 | 0.0 | 17.5 | 400 | $C_6H_5Cl$ | 2.9 |
| 28 | Ru | 0.11 | 10.0 | NaCl | 10.0 | 20.0 | 0.0 | 0.0 | 17.5 | 400 | $C_6H_5Cl$ | 4.2 |
| 29 | Rh | 0.23 | 10.0 | NaCl | 10.0 | 20.0 | 0.0 | 0.0 | 17.5 | 400 | $C_6H_5Cl$ | 2.5 |
| 30 | Ir | 0.16 | 10.0 | NaCl | 10.0 | 20.0 | 0.0 | 0.0 | 17.5 | 400 | $C_6H_5Cl$ | 2.9 |
| 31 | Pd | 0.12 | 10.0 | NaBr | 11.0 | 20.0 | 0.0 | 0.0 | 24 | 400 | $C_6H_5Br$ | 0.67 |
| 32 | Pt | 0.13 | 10.0 | NaCl | 10.0 | 20.0 | 0.0 | 0.0 | 24 | 400 | $C_6H_5Cl$ | 2.8 |
| 33 | Pd | 0.13 | 10.0 | NaCl | 10.0 | 20.0 | 0.0 | 0.0 | 24 | 400 | $C_6H_5Cl$ | 3.3 |
| 34 | Ru | 0.11 | 10.0 | NaCl | 10.0 | 20.0 | 0.0 | 0.0 | 24 | 400 | $C_6H_5Cl$ | 4.2 |
| 35 | Rh | 0.23 | 10.0 | NaCl | 10.0 | 20.0 | 0.0 | 0.0 | 24 | 400 | $C_6H_5Cl$ | 3.0 |
| 36 | Ir | 0.16 | 10.0 | NaCl | 10.0 | 20.0 | 0.0 | 0.0 | 24 | 400 | $C_6H_5Cl$ | 4.6 |
| 37 | Pd | 0.12 | 15.0 | NaBr | 11.0 | 20.0 | 0.0 | 0.0 | 16 | 400 | $C_6H_5Br$ | 0.78 |
| 38 | Pt | 0.13 | 15.0 | NaCl | 10.0 | 20.0 | 0.0 | 0.0 | 16 | 400 | $C_6H_5Cl$ | 4.1 |
| 39 | Pd | 0.13 | 15.0 | NaCl | 10.0 | 20.0 | 0.0 | 0.0 | 16 | 400 | $C_6H_5Cl$ | 4.2 |
| 40 | Ru | 0.11 | 15.0 | NaCl | 10.0 | 20.0 | 0.0 | 0.0 | 16 | 400 | $C_6H_5Cl$ | 5.9 |
| 41 | Ru | 0.23 | 15.0 | NaCl | 10.0 | 20.0 | 0.0 | 0.0 | 16 | 400 | $C_6H_5Cl$ | 4.9 |
| 42 | Ir | 0.16 | 15.0 | NaCl | 10.0 | 20.0 | 0.0 | 0.0 | 16 | 400 | $C_6H_5Cl$ | 6.1 |
| 43 | Pd | 0.12 | 15.0 | NaBr | 11.0 | 20.0 | 0.0 | 0.0 | 20 | 400 | $C_6H_5Br$ | 0.80 |
| 44 | Pt | 0.13 | 15.0 | NaCl | 10.0 | 20.0 | 0.0 | 0.0 | 20 | 400 | $C_6H_5Cl$ | 4.2 |
| 45 | Pd | 0.13 | 15.0 | NaCl | 10.0 | 20.0 | 0.0 | 0.0 | 20 | 400 | $C_6H_5Cl$ | 4.2 |
| 46 | Ru | 0.11 | 15.0 | NaCl | 10.0 | 20.0 | 0.0 | 0.0 | 20 | 400 | $C_6H_5Cl$ | 5.5 |
| 47 | Rh | 0.23 | 15.0 | NaCl | 10.0 | 20.0 | 0.0 | 0.0 | 20 | 400 | $C_6H_5Cl$ | 4.2 |
| 48 | Ir | 0.16 | 15.0 | NaCl | 10.0 | 20.0 | 0.0 | 0.0 | 20 | 400 | $C_6H_5Cl$ | 5.1 |
| 49 | Pd | 0.14 | 0.0 | NaCl | 10.0 | 20.0 | 11.0 | 0.0 | 24 | 400 | $C_6H_4Cl$ | 2.1 |
| 50 | Pd | 0.12 | 0.0 | None | 0.0 | 20.0 | 0.0 | 12.0 | 24 | 400 | None | 0.0 |
| 51 | Pd | 0.03 | 1.0 | NaCl | 11.0 | 20.0 | 0.0 | 0.0 | 19 | 400 | $C_6H_5Cl$ | Trace |
| 52 | Pd | 0.03 | 6.0 | NaCl | 11.0 | 20.0 | 0.0 | 0.0 | 17 | 400 | $C_6H_5Cl$ | 0.45 |

EXAMPLE IV

An additional series of runs were carried out wherein various aromatic compounds, palladium acetate, NaCl, $HNO_3$ and acetic acid were refluxed at atmospheric pressure and a temperature of 116° C. The results are tabulated below in Table IV.

EXAMPLE VI

A mixture of 0.2282 gram of palladium acetate, 0.6298 grams of sodium chloride, 0.7405 gram of sodium nitrite, 1.83 grams of benzene and 25 milliliters of acetic acid was refluxed for 20 hours at atmospheric pressure and a temperature of 11° C. Analysis by gas chromatography

TABLE IV

| Run No. | Aromatic compound | Millimols of Aromatic compound | Millimols of Palladium acetate | Millimols of NaCl | Millimols of $HNO_3$ | Reaction time, hours | Millimols of acetic acid | Product and millimols of product |
|---|---|---|---|---|---|---|---|---|
| 53 | Phenyl acetate | 20.0 | 1.0 | 13.0 | 10.0 | 21 | 400 | p-Chlorophenol (0.04), p-chlorophenyl acetate (0.01) and o-chlorophenyl acetate. |
| 54 | Toluene | 20.0 | 1.2 | 12.0 | 10.0 | 21 | 400 | o-Chlorotoluene (0.9) and m- and p-chlorotoluene (4.5). |
| 55 | Anisole | 20.0 | 1.0 | 9.0 | 10.0 | 21 | 400 | Small amounts of a number of compounds, not identified. |
| 56 | Chlorobenzene | 20.0 | 1.0 | 10.0 | 10.0 | 21 | 400 | o-Dichlorobenzene (0.35), m-dichlorobenzene (0.22) and p-dichlorobenzene (0.89). |
| 57 | Methyl benzoate | 20.0 | 1.0 | 11.0 | 10.0 | 21 | 400 | Small amounts of a number of compounds, not identified. |
| 58 | Acetophenone | 20.0 | 1.0 | 10.0 | 10.0 | 21 | 400 | No reaction. |
| 59 | Naphthalene | 20.0 | 1.1 | 10.0 | 10.0 | 21 | 400 | 2-chloronaphthalene (0.47) and 1-chloronaphthalene (0.7). |

EXAMPLE V

A mixture of 3.9 grams of hydrogen chloride, 2.0 milliliters of 70 percent aqueous nitric acid, 15.4 grams of benzene, 100 grams of acetic acid and 1.77 grams of palladium chloride was placed into a 200-milliliter high pressure glass bomb which also contained a magnetic stirrer and a thermowell. The stirred mixture had a pressure of 26 pounds per square inch gauge. The pressure was brought up to 60 pounds total with oxygen and repressured to this pressure with oxygen when the total pressure fell below 40 pounds per square inch gauge during a two-hour period. Total oxygen consumption was 90 pounds. The increase in weight of the product was 3.9 grams and there was found, by gas chromatography, 8.8 grams of chlorobenzene, 0.12 gram of ortho dichlorobenzene and 0.19 gram of para dichlorobenzene. The oxygen enables far more product to form than can be accounted for by the palladium salt or the nitric acid. Thus, this illustrates a truly catalytic reaction

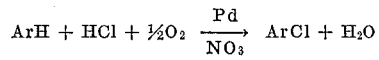

showed the presence of 4.1 millimols of chlorobenzene.

EXAMPLE VII

A mixture of 2.04 millimols of palladium acetate, 252 millimols of HCl, 310 millimols of toluene, 10 millimols of 70 percent aqueous nitric acid and 159 grams of acetic acid were heated at 100° C. under an oxygen pressure of 140 pounds per square inch gauge for five hours. Gas chromatographic analysis showed the presence of eighty millimols of ortho chlorotoluene, 155 millimols of para chlorotoluene and 1.35 millimols of dichlorotoluene. Thus, there are formed 118 mols of product per mol of palladium and 24 mols of product per mol of nitric acid.

EXAMPLE VIII

In the following series of reactions with toluene at 120° C. under 170 pounds per square inch gauge of oxygen for four hours it can be seen that little or no reaction occurred in runs where either inert solvent, or catalyst, or both, were missing, but in runs with both, excellent conversion of reactants to chlorotoluene was obtained.

TABLE V

| Run No. | Catalyst | Millimoles | | | | | | Conversion based on HCl | Conversion based on toluene |
|---|---|---|---|---|---|---|---|---|---|
| | | Catalyst | HCl | HNO₃ | Water | Acetic acid | Toluene | | |
| 64 | None | 0 | 68.5 | 2.4 | 0 | 0 | 1,473 | 0 | 0 |
| 65 | Pd(OAc)₂ | 2 | 46.6 | 2.4 | 0 | 0 | 1,473 | 0 | 0 |
| 66 | None | 0 | 183.5 | 9.6 | 0 | 1,990 | 303 | 6.5 | 3.9 |
| 67 | Cu(OAc)₂* | 10 | 175.5 | 9.6 | 0 | 1,990 | 303 | 75.0 | 43.4 |
| 68 | Pd(OAc)₂ | 2 | 252 | 10.3 | 0 | 2,650 | 310 | 93.0 | 75.8 |
| 69 | Cu(OAc)₂ | 10 | 268 | 11.1 | 1,928 | 1,990 | 303 | 91.4 | 80.9 |
| 70 | Cu(OAc)₂ | 10 | 65.8 | 2.4 | 0 | 0 | 1,522 | 0 | 0 |
| 71 | Cu(OAc)₂ | 10 | 26.8 | 11.1 | 945 | 1,990 | 303 | 95.6 | 84.7 |

*OAc=Acetate.

EXAMPLE IX

The necessity of both inert solvent and catalyst is again demonstrated in the following series of runs with mesitylene run at 70° C. and 100 pounds per square inch gauge of oxygen for four hours.

TABLE VI

| Run No. | Catalyst | Millimols | | | | | | Reaction occurring |
|---|---|---|---|---|---|---|---|---|
| | | Catalyst | HCl | HNO₃ | Water | Acetic acid | Mesitylene | |
| 72 | Pd(OAc)₂ | 2 | 26.8 | 11.1 | 945 | 1,990 | 303 | Yes. |
| 73 | None | | 57.5 | 2.4 | None | None | 1,155 | No. |
| 74 | Pd(OAc)₂ | 2 | 55.0 | 2.4 | None | None | 1,155 | No. |

EXAMPLE X

The following series of experiments show the wide variety of metal compounds that can be used in the catalyst system in oxychlorination. Each run was made at 120° C. and under 170 pounds per square inch gauge of oxygen for four hours. The well-stirred charge contained ten millimols of metallic compound, 268 millimols of HCl, 303 millimols of toluene, 11.1 millimols of nitric acid, 1990 millimols of acetic acid and 928 millimols of water in each case. The following results were obtained.

TABLE VII

| Run No. | Metal or metallic compound | Percent conversion of HCl to chlorotoluene | Percent conversion of toluene to chlorotoluene |
|---|---|---|---|
| 75 | Pd ¹ | 97.7 | 86.5 |
| 76 | Pt ¹ | 33.3 | 29.5 |
| 77 | V₂O₅ | 39.7 | 35.1 |
| 78 | CrCl₃ | 35.1 | 31.1 |
| 79 | FeCl₃ | 26.6 | 23.5 |
| 80 | Ni(OAc)₂ | 41.4 | 36.4 |
| 81 | CdCl₂ | 31.1 | 27.5 |
| 82 | Sn(Cl)₄ | 28.4 | 25.2 |
| 83 | SbCl₃ | 41.2 | 36.4 |
| 84 | OsCl₃ | 41.4 | 36.6 |
| 85 | PtCl₂ | 29.2 | 25.9 |
| 86 | HgCl₂ | 35.8 | 31.6 |
| 87 | BiCl₃ | 27.6 | 27.1 |
| 88 | RhCl₃ | 34.3 | 30.3 |
| 89 | MnO₂ | 60.5 | 53.5 |
| 90 | CuCl₂ | 99.5 | 94.6 |
| 91 | PdCl₂ | 100.0 | 89.9 |

¹ Metal.

LiCl, AlCl₃, CaCl₂, TiCl₄, ZnCl₂, LaCl₂, WCl₆ when similarly employed showed no catalytic effect.

EXAMPLE XI

It has been found that compounds of four metals, cobalt, cerium, vanadium and manganese lead to methyl group oxidation subsequent to oxychlorination, i.e., when the aromatic is a compound carrying from one to five alkyl substituents wherein the carbon adjacent to the aromatic ring contains at least one hydrogen, such as toluene, chlorotoluene is first formed and if reaction is continued the chlorotoluene is converted to chlorobenzoic acid. This is illustrated in the following runs at 120° C. and 170 pounds per square inch gauge of oxygen in which 270 millimols of HCl, 10 millimols of HNO₃, 1990 millimols of acetic acid, and 303 millimols of toluene was used in each case. In these runs oxygen is maintained at 170 pounds per square inch gauge in the reactor but is fed from a bomb where the drop in pressure is noted. For complete conversion to chlorotoluenes a 600 pound drop

TABLE VIII

| Run No. | Catalyst | Millimols catalyst | Millimols water | Oxygen pressure drop | Percent HCl as chlorotoluene | Comments |
|---|---|---|---|---|---|---|
| 92 | MnO₂ | 10 | 0 | 1,895 | | 5.5 grams of solids were isolated by filtration. Infrared comparison with authentic samples showed this to be a mixture of para chlorobenzoic acid and orthochlorobenzoic acid with little, if any, benzoic acid. |
| 93 | MnO₂ | 10 | 928 | 1,788 | | Solids isolated. |
| 94 | CoCl₂ | 10 | 0 | 1,099 | | Chlorobenzoic acid solids isolated. |
| 95 | CoCl₂ | 10 | 928 | 591 | 31 | Chromatographic analysis indicated products from methyl group oxidation. |
| 96 | V₂O₅ | 10 | 0 | 667 | 42 | Do. |
| 97 | V₂O₅ | 10 | 928 | 658 | 58 | Do. |
| 98 | Ce(NO₃)₃ | 10 | 0 | 1,000 | 7.89 | In Runs 98 and 99 nitric acid was not added, the nitrate ion came from the cerium nitrate. In 99 reaction carried only to chlorotoluenes but in 98 these reacted further to give larger pressure drop and less chlorotoluenes. |
| 99 | Ce(NO₃)₃ | 10 | 928 | 612 | 97.4 | | in oxygen would occur. Any larger pressure drop or pressure drop of 600 pounds with significantly less than 100 percent of the expected chlorotoluenes being found would indicate oxidation of the methyl group.

EXAMPLE XII

I expected that oxychlorination could be hastened with palladium or copper used in addition to a side chain oxidation catalyst. Thus, the palladium or copper would accelerate the formation of chlorotoluene and the cobalt, manganese, cerium or vanadium compound would catalyze the further oxidation to chlorobenzoic acid. Unexpectedly it was found that copper and palladium inhibit and prevent the subsequent methyl group oxidation. This is shown in the following experiments at 170 pounds per square inch gauge of oxygen, with 11.1 millimols of nitric acid, 269 millimols of HCl, 1990 millimols of acetic acid, 928.0 millimols of water and 303 millimols of toluene. Manganese oxide would be expected to bring the total pressure drop to 1788 pounds (Run No. 103) but the addition of palladium or copper acetates limits the pressure drop to about that expected for oxychlorination.

TABLE IX

| Run No. | Catalyst | Catalyst millimols | Temp., °C. | Pressure-drop, p.s.i.g. |
|---|---|---|---|---|
| 100 | Pd(OAc)$_2$ / MnO$_2$ | 2.0 / 10.0 | 120 | 500 |
| 101 | Pd(OAc)$_2$ | 2 | 120 | 585 |
| 102 | Cu(OAc)$_2$ / MnO$_2$ | 2 / 10.0 | 80 | 426 |
| 103 | MnO$_2$ | 10 | 120 | 1,788 |

Thus, when palladium or copper compounds are added to systems catalyzed by cobalt, manganese, vanadium or cerium compounds side chain oxidation is inhibited.

EXAMPLE XIII

An additional series of runs were made wherein 2.0 millimols of palladium acetate, 269 millimols of HCl, 1990 millimols of acetic acid, 928 millimols of water and 303 millimols of toluene were heated with a nitrogen oxide at 120° C. under 170 pounds per square inch gauge of oxygen over a period of four hours. The results obtained are tabulated below in Table X.

TABLE X

| Run No. | Nitrogen oxide | Millimols of nitrogen oxide | Oxygen pressure drop in p.s.i.g. | Percent conversion to chlorotoluene based on HCl |
|---|---|---|---|---|
| 103 | NO | 13.4 | 534 | 80.2 |
| 104 | N$_2$O | 11.4 | 0 | 0 |
| 105 | NO$_2$ | 13.0 | 560 | 90.2 |

Note that whereas NO and NO$_2$ are convertible to nitrate ions and are operative herein, N$_2$O is not convertible to nitrate ions and accordingly is inoperative.

Obviously, many modifications and variations of the invention, as hereinabove set forth, can be made without departing from the spirit and scope thereof, and therefore only such limitations should be imposed as are indicated in the appended claims.

I claim:

1. A process for preparing a halogenated aromatic hydrocarbon selected from the group consisting of chloro and bromo aromatic hydrocarbons which consists of heating an aromatic compound selected from the group consisting of an aromatic hydrocarbon and a halogenated aromatic hydrocarbon with (1) a metal selected from the group consisting of platinum, palladium, iridium, rhodium, osmium, ruthenium, copper, manganese, cerium, cobalt, vanadium, chromium, iron, nickel, cadmium, tin, antimony, mercury and bismuth or salts or oxides of these metals, (2) a substance selected from the group consisting of nitrate ions, nitrite ions, NO and NO$_2$, and (3) a halogen ion selected from the group consisting of chloride ions and bromide ions in an inert organic solvent, wherein the reaction is carried out at a temperature of about 15° to about 200° C. and a pressure of about 0.1 to about 10,000 pounds per square inch gauge for about 0.0001 to about 200 hours, with the amount of halogen relative to the aromatic hydrocarbon, on a molar basis, being from about 10:1 to about 1:20, the amount of metal or salt or oxide thereof, on a molar basis, being from about 0.0001 to about five percent, and the amount of nitrate, nitrite, NO or NO$_2$, on a molar basis, relative to the aromatic hydrocarbon being from about 1:1 to about 1:10$^6$.

2. The process of claim 1 wherein said aromatic hydrocarbon compound is benzene.

3. The process of claim 1 wherein said aromatic hydrocarbon compound is toluene.

4. The process of claim 1 wherein said aromatic hydrocarbon compound is chlorobenzene.

5. The process of claim 1 wherein said aromatic hydrocarbon compound is naphthalene.

6. The process of claim 1 wherein said metal is palladium.

7. The process of claim 1 wherein said metal is copper.

8. The process of claim 1 wherein said metal is ruthenium.

9. The process of claim 1 wherein said metal is rhodium.

10. The process of claim 1 wherein said metal is iridium.

11. The process of claim 1 wherein said salt is a noble metal salt.

12. The process of claim 1 wherein said salt is an alkanoic carboxylic acid salt of platinum, palladium, iridium, rhodium, osmium or ruthenium.

13. The process of claim 1 wherein said salt is palladium acetate.

14. The process of claim 1 wherein said salt is cupric acetate.

15. The process of claim 1 wherein said chloride ions are obtained from NaCl.

16. The process of claim 1 wherein said chloride ions are obtained from HCl.

17. The process of claim 1 wherein said bromide ions are obtained from NaBr.

18. The process of claim 1 wherein said nitrate ions are obtained from HNO$_3$.

19. The process of claim 1 wherein said nitrate ions are obtained from NaNO$_3$.

20. The process of claim 1 wherein said substance is NO$_2$.

21. The process of claim 1 wherein said substance is NO.

22. The process of claim 1 wherein said nitrite ions are obtained from sodium nitrite.

23. The process of claim 1 wherein the reaction is carried out in an alkanoic carboxylic acid having from one to ten carbon atoms.

24. The process of claim 1 wherein the reaction is carried out in acetic acid.

25. The process of claim 1 wherein the reaction is carried out in the presence of molecular oxygen.

26. The process of claim 1 wherein a metal salt or oxide of palladium is used, said aromatic hydrocarbon compound is benzene and said reaction is carried out in an alkanoic carboxylic acid having from one to ten carbon atoms.

27. The process of claim 1 wherein a metal salt or oxide of palladium is used, said aromatic hydrocarbon compound is benzene and said reaction is carried out in acetic acid.

28. The process of claim 1 wherein a metal salt or oxide of palladium is used, said aromatic hydrocarbon compound is toluene and said reaction is carried out in an alkanoic carboxylic acid having from one to ten carbon atoms.

29. The process of claim 1 wherein a metal salt or oxide of palladium is used, said aromatic hydrocarbon compound is toluene and said reaction is carried out in acetic acid.

30. The process of claim 1 wherein a metal salt or oxide of copper is used, said aromatic hydrocarbon compound is benzene and said reaction is carried out in an alkanoic carboxylic acid having from one to ten carbon atoms.

31. The process of claim 1 wherein a metal salt or oxide of copper is used, said aromatic hydrocarbon compound is benzene and said reaction is carried out in acetic acid.

32. The process of claim 1 wherein a metal salt or oxide of copper is used, said aromatic hydrocarbon compound is toluene and said reaction is carried out in an alkanoic carboxylic acid having from one to ten carbon atoms.

33. The process of claim 1 wherein a metal salt or oxide of copper is used, said aromatic hydrocarbon compound is toluene and said reaction is carried out in acetic acid.

34. The process of claim 1 wherein said metal is selected from the group consisting of cobalt, cerium, vanadium and manganese and said aromatic hydrocarbon compound carries from one to five alkyl substituents wherein the carbon adjacent to the aromatic hydrocarbon ring contains at least one hydrogen.

35. The process of claim 1 wherein said metal is selected from the group consisting of cobalt, cerium, vanadium and manganese and said aromatic hydrocarbon compound is toluene.

36. The process of claim 1 wherein at least two of said metals are employed, the first of which is selected from the group consisting of cobalt, manganese, vanadium and cerium and the second of which is selected from the group consisting of palladium and copper and the aromatic hydrocarbon compound carries from one to five alkyl substituents wherein the carbon adjacent to the aromatic hydrocarbon ring contains at least one hydrogen.

37. The process of claim 1 wherein at least two of said metals are employed, the first of which is manganese and the second of which is selected from the group consisting of palladium and copper and the aromatic hydrocarbon compound carries from one to five alkyl substituents wherein the carbon adjacent to the aromatic hydrocarbon ring contains at least one hydrogen.

38. The process of claim 1 wherein the reaction is carried out at a temperature of about 60° to about 150° C. and a pressure of about ten to about 1000 pounds per square inch gauge for about one to about ten hours, with the amount of halogen relative to the aromatic hydrocarbon, on a molar basis, being from about 2:1 to about 1:2, the amount of metal or salt or oxide thereof, on a molar basis, being from about 0.01 to about one percent, and the amount of nitrate, nitrite, NO or $NO_2$, on a molar basis, relative to the aromatic hydrocarbon being from about 1:3 to about $1:10^6$.

References Cited

UNITED STATES PATENTS

| | | | |
|---|---|---|---|
| 2,152,357 | 3/1939 | Moyer | 260—650 |
| 2,174,574 | 10/1939 | Farthing | 260—650X |
| 3,145,237 | 8/1964 | Van Helden et al. | 260—670 |
| 3,160,653 | 12/1964 | Benning et al. | 260—650X |
| 3,214,481 | 10/1965 | Heinemann et al. | 260—650X |
| 3,214,482 | 10/1965 | Caropreso et al. | 260—650X |

HOWARD T. MARS, Primary Examiner

U.S. Cl. X.R.

260—479R, 623H, 649, 649DP

PO-1050
(5/69)

UNITED STATES PATENT OFFICE
CERTIFICATE OF CORRECTION

Patent No. __3,591,645__  Dated __July 6, 1971__

Inventor(s) __Charles M. Selwitz__

It is certified that error appears in the above-identified patent and that said Letters Patent are hereby corrected as shown below:

Table III, Run No. 43, under "Product", "$C_5H_6Br$" should read "$C_6H_5Br$".

Table III, Run No. 48, under "Product", "$C_5H_6Cl$" should read "$C_6H_5Cl$".

Table III, Run No. 49, under "Product", "$C_6H_4Cl$" should read "$C_6H_5Cl$".

Table VIII, Run No. 98, under "Percent ... toluene" "7.89" should read "79.8".

Signed and sealed this 7th day of December 1971.

(SEAL)
Attest:

EDWARD M. FLETCHER, JR.        ROBERT GOTTSCHALK
Attesting Officer              Acting Commissioner of Patents